May 23, 1944.   H. A. EVANS   2,349,710
ADHESIVE FABRIC AND METHOD OF MANUFACTURING THE SAME
Filed Aug. 14, 1941   7 Sheets-Sheet 1
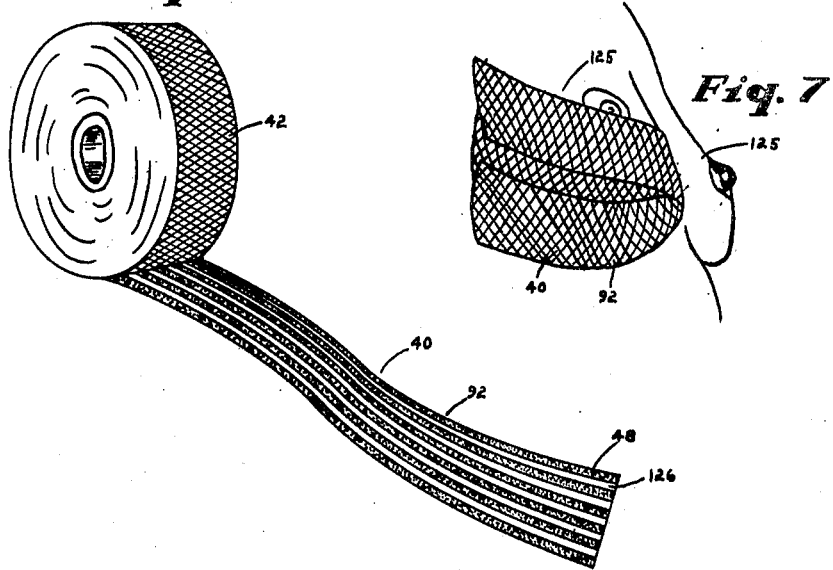
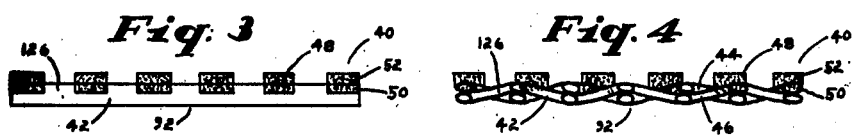
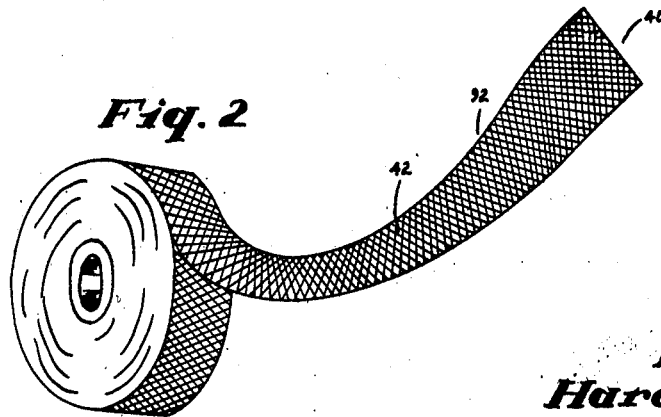
Inventor
Harold A. Evans
By Thomas A. Jenckes
Attorney
BEST AVAILABLE COPY

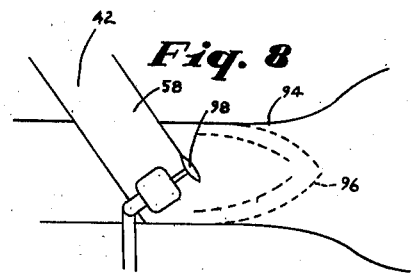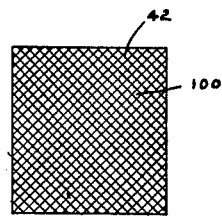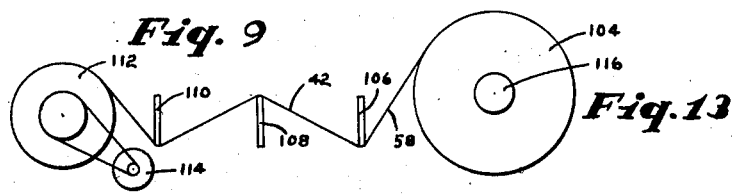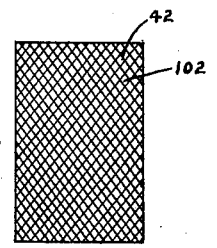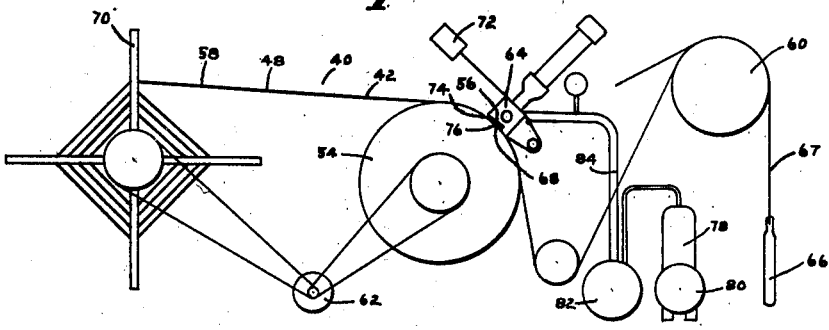

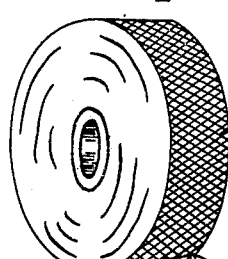
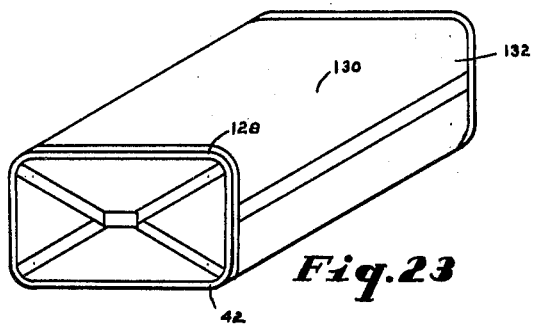
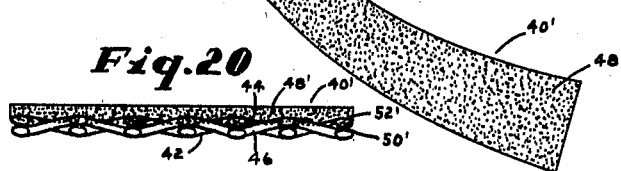
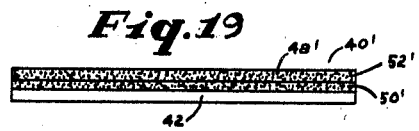
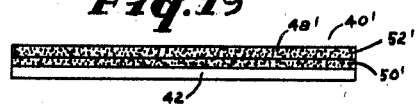
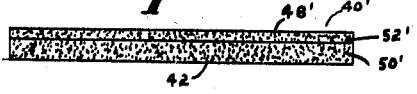
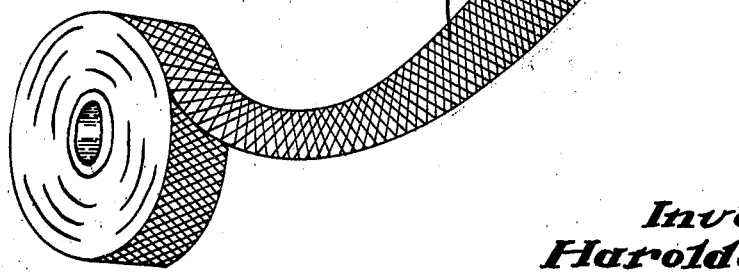

May 23, 1944.  H. A. EVANS  2,349,710
ADHESIVE FABRIC AND METHOD OF MANUFACTURING THE SAME
Filed Aug. 14, 1941  7 Sheets-Sheet 4
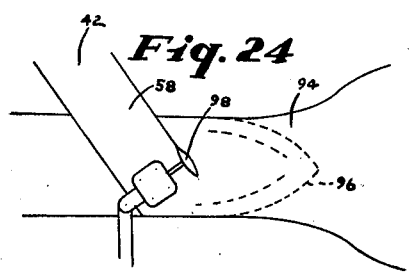
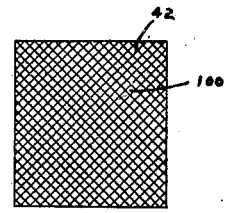
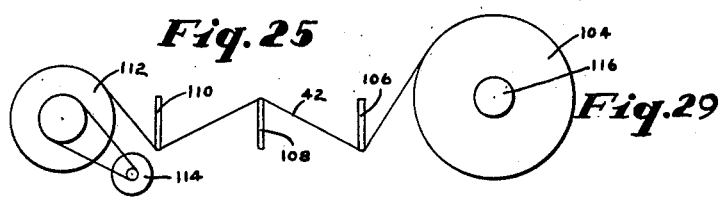
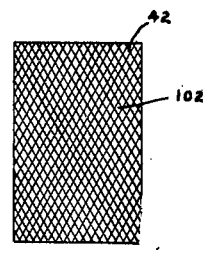
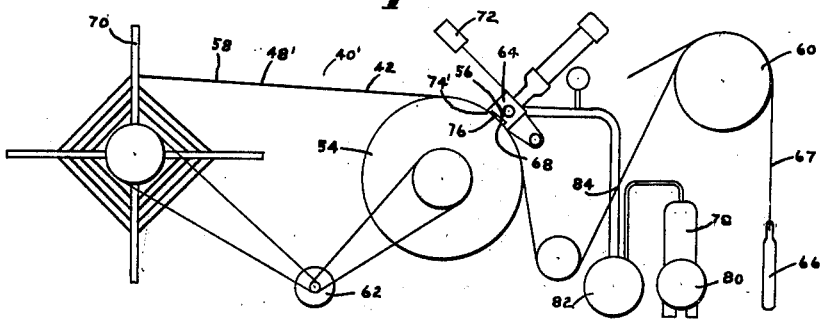
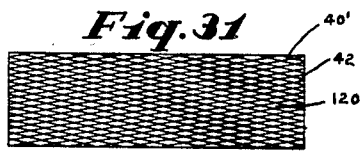
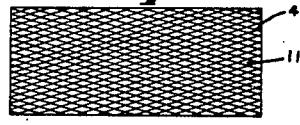
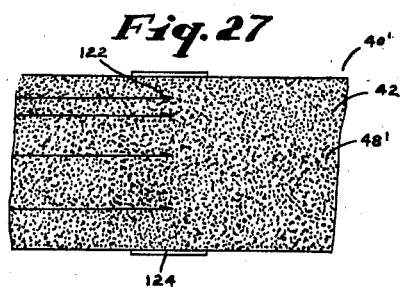
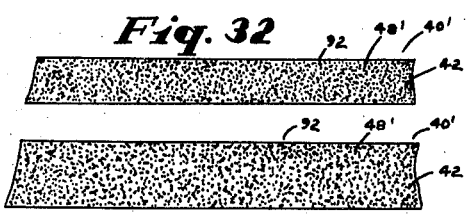
Inventor
Harold A. Evans
By Thomas A. Jencks
Attorney

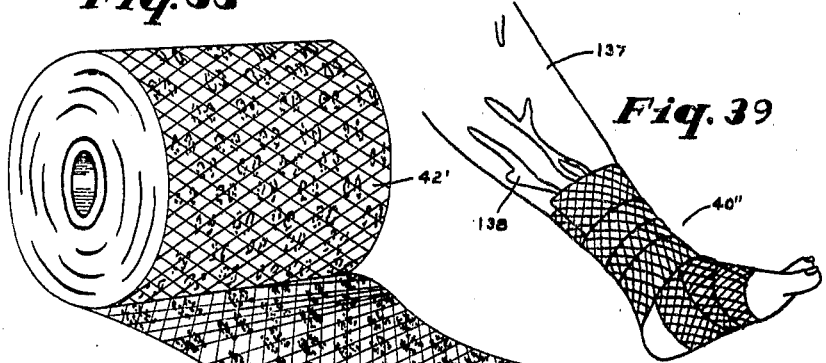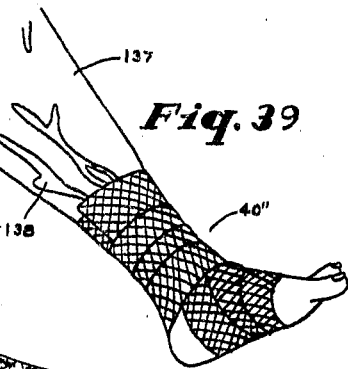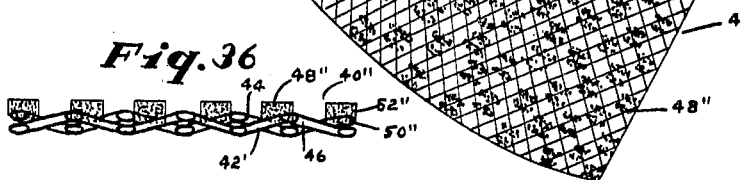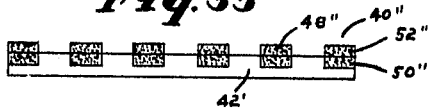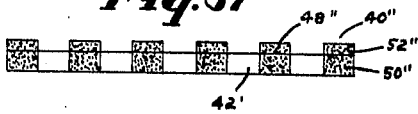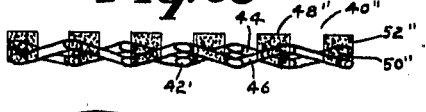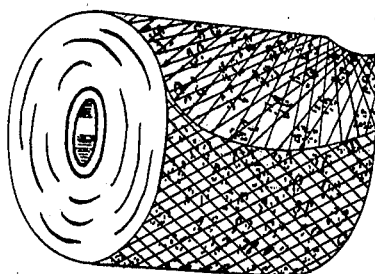

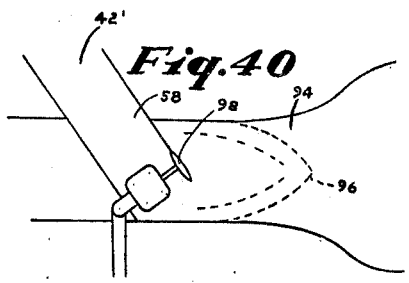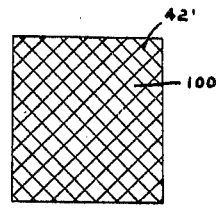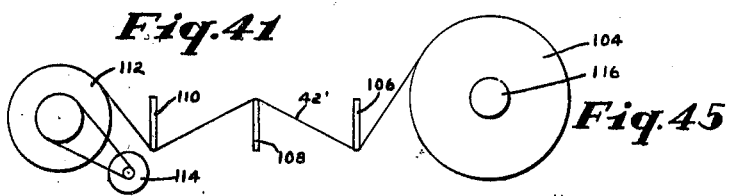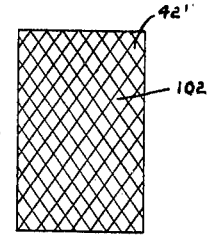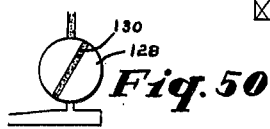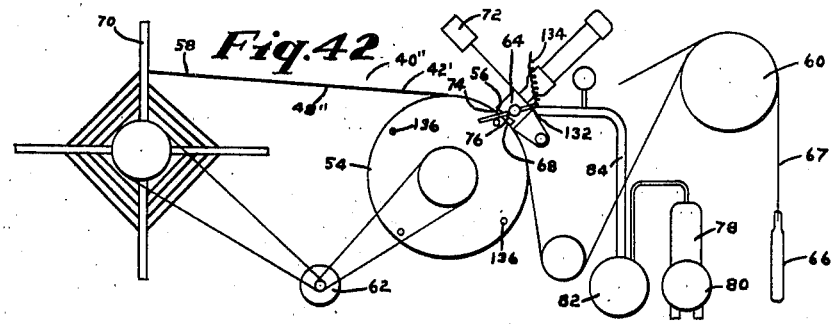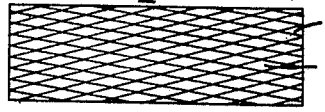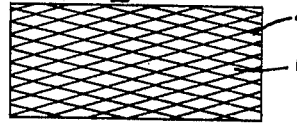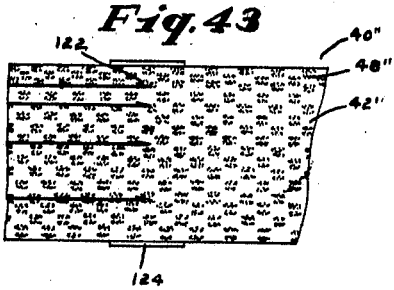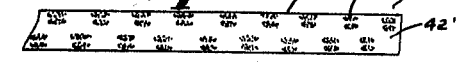

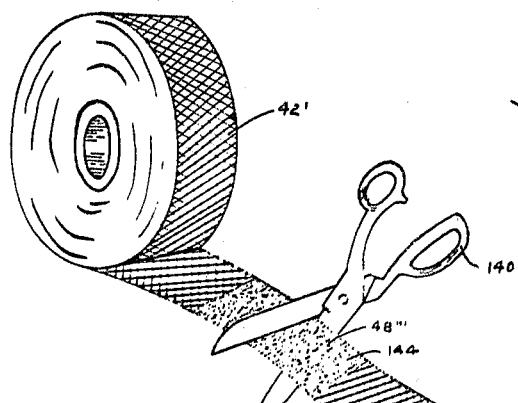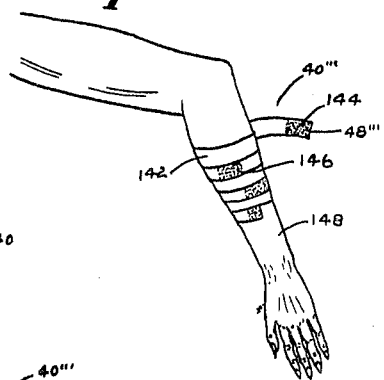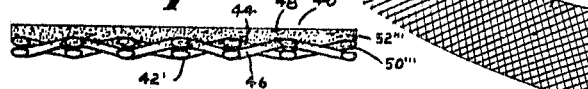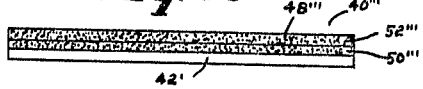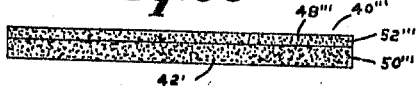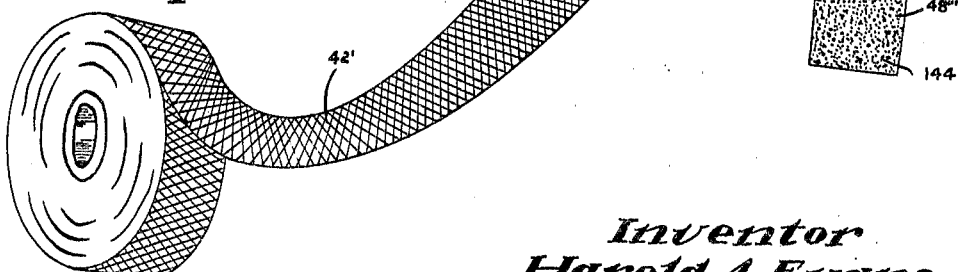

UNITED STATES PATENT OFFICE 2,349,710

ADHESIVE FABRIC AND METHOD OF MANUFACTURING THE SAME

Harold A. Evans, Fairhaven, Mass., assignor to Coreve Corporation, Fairhaven, Mass., a corporation of Massachusetts Application August 14, 1941, Serial No. 406,888

17 Claims. (Cl. 117—7)

My invention relates to improvements in conformable adhesive fabrics and methods of their manufacture.

My invention is in certain respects an improvement on the adhesive coated fabrics and method of making the same described in my co-pending application for Letters Patent, Ser. No. 406,519, filed August 12, 1941, for Adhesive fabric and method of making the same, in which the fabric is not only coated with a layer of adhesive, but in which the layer of adhesive so coated is at least partially permeated through the fabric forming a layer of adhesive underneath at least some of the threads thereof integral with the surface coated layer, whether said layer comprises an all over covering, transversely spaced stripes, or longitudinally spaced areas of adhesive throughout the length of the fabric, and my invention specifically relates to such fabric having a layer of adhesive at least partially permeated therethrough in the manner described in said application.

The present invention is limited to so-called conformable fabrics, preferably constructed of fabric cut on the bias so as to provide a stretchable fabric, and preferably one which is so fabricated as to be supplementally elastically contractible, although certain features of my invention are not limited to a fabric which is elastically contractible, but also includes in some aspects thereof fabrics which merely stretch to be conformable, and insofar as these features of my invention are concerned, including the conformable and elastically contractible features, while I preferably also impregnate the coated layer within the fabric to obtain better results, good results may be obtained in some instances if the layer of adhesive comprising continuous areas or spaced areas is merely bonded to the fabric.

I am aware that attempts have been made in the prior art to employ adhesive fabric cut on the bias. As is well known, fabric cut on the bias will stretch longitudinally and also transversely, in some instances stretching longitudinally up to 50% of its length. Such a fabric, particularly a gauze fabric, is not suitable for usual commercial uses, such as in surgical tape or in masking tape as it stretches too much in use, in often cases so much as to break any continuous adhesive coating thereon. I believe I am the first, therefore, to provide an adhesive fabric in which its stretchability is so regulated and limited as to permit the application of an adhesive thereto in continuous form which will at all times in use function as an elastic band affixed thereto, and preferably at least partially permeated therein, to cause the bias cut fabric when stretched in use to return substantially to its prestretched condition.

A further object of my invention is to provide improvements in the method of making such an adhesive fabric which is preferably elastically contractible as well as conformable, in which, during the course of its manufacture, I preferably subject the bias cut fabric to a succession of longitudinal stretchings, one a prestretching to draw the fabric down to the desired width and to eliminate any excessive amount of stretching more than desirable in a bias cut fabric for commercial uses, and the second an intermediate stretching prior to the application of adhesive to keep the fabric in a taut condition while the adhesive is being applied and to open up the interstices between the threads for the insertion of the adhesive. It is also obvious that both the first and second stretches tend to break up any size which may be accumulated around the interstices and the threads themselves and thus cover the pores to prevent the impregnation of the adhesive within the pores of the fibers and threads and the interstices of the threads. These first and second stretchings subject the fabric to so much tension and so stretch the pores and interstices that the starch tends to fall out prior to the application of adhesive, thus enabling the adhesive when applied to directly adhere to the threads and fibers and if applied in a continuous elastic sheet, or continuous stripes to adhere directly to the threads or fibers to form an elastic band or bands, preferably at least partially permeated within the fabric to provide a continuous elastic sheet tending in use to retract the fabric when stretched in use substantially to its just prestretched condition. If the adhesive were applied without giving the fabric the first large prestretching, and the stretching took place substantially completely during the application of the adhesive or after the application of adhesive, the fabric would shrink so much in width up to 50% to correspond to its longitudinal stretch that it would tend to wrinkle or draw the entire surface of an adhesive covering sheet over it in folds after drying. A coating of .005 in. is desirable, and unless the fabric is given a prestretching, the coating would tend to contract at the center portion up to .015 in. and it would be impossible to produce a coating of uniform thickness over such an unstretched sheet. Inasmuch as the center area remains substantially stationary, the fabric would contract an additive amount near its edges, thereby tending to provide a fabric having a tendency to have curling edges. Additional advantages of the second stretch just prior to the application of the adhesive are to keep the fabric taut to enter between the fountain and pad without wrinkles and to open up the interstices between the threads for the ready entry of adhesive thereto to at least partially permeate the fabric.

The fabric is also given a third stretch immediately after the application of the adhesive to keep the fabric taut during the drying operation and to provide additional elasticity in the continous adhesive covering layer, due to the fact that the solvent preferably employed in the application of the adhesive evaporates during the drying stage, tending to leave voids to make the set covering elastic to tend to fill up said voids to tend to contract after the fabric is dried, the solvent removed and the stretching means removed. The final stretch further opens up the interstices between the threads to assist in the adhesive permeating the fabric. This third stretch also tends to pull the threads deeper within the layer of adhesive solution, causing a firmer permeation and hence bond of the adhesive covering after the evaporation of the solvent. Most adhesives are made of a rubber base and the tendency of rubber to become drugged or dead and lose its elacticity under certain conditions in use, such as being calendered, is well known. It is also known that rubber is similarly drugged or rendered inert to lose its elasticity and resiliency while in a solvent solution. The fabric is given its final stretch while in this inert condition, so that when the solvent is evaporated therefrom to set the adhesive, the solvent drug is evaporated off and the adhesive again resumes its elasticity and resiliency and being set in a stretched condition has a further tendency to return to an unstretched condition.

Thus in use, in accordance with my improved method, the bias cut fabric is given an initial stretch, in certain instances up to 25%. By this initial stretch the amount of stretchability in the fabric is substantially cut in two, as most adhesive bias cut fabrics have an elastic limit of 50% stretch. This limits any stretching which may be given in use to a reasonable amount and prevents my improved fabric from stretching in use excessively into useless or abortive positions as it readily could if the degree of stretch in the final fabric were not limited by the initial prestretching. While the fabric is left somewhat elastic, this prestretching maintains a reasonable uniformity of width and length in the finished fabric. In the second stretch, the fabric is again stretched for the purposes hitherto specified up to 10%, whereas in the third stretch the fabric may be again stretched up to 5%, leaving a minimum balance of stretchability in the finished fabric up to 10%, and in most instances more as the elastic adhesive band or covering tends to contract somewhat after the stretching means therefor are removed after the solvent has been evaporated therefrom. By controlling the amount of the second and third stretchings and limiting them to less than 15% just prior to and after the application of adhesive, a limited amount of stretch is permitted in the finished fabric to an amount always insufficient to break the rubber band of adhesive covering layer, causing it to continuously function in use as an elastic layer to immediately tend to return the fabric when stretched in use substantially to its prestretched condition, thereby providing a fabric which is conformable and is always elastically contractible to cause it to tightly bind or hug around any irregular edge or object, whether employed as a commercial, masking, or surgical fabric or bandage. It is thus obvious that by regulating the amount of these stretchings, the amount of elasticity remaining in the finished fabric is therefore predetermined, the elasticity being particularly accurately predetermined during the second and third stretchings. It is obvious, however, that my improved method produces a fabric suitable for certain uses if any one or more of the stages of stretching is omitted, provided that the other stages are correspondingly regulated in a suitable manner to achieve the desired results.

If desired, the adhesive may be applied in spaced stripes or spaced areas to provide a fabric which is pervious and hence particularly useful for bandaging or covering any portion of the body to prevent any such covered portion of the body from getting excessively hot, and particularly if employed as a surgical bandage to permit breathing, so that air may reach to the actual wound being healed to tend to heal it more quickly. Inasmuch as my improved fabric is preferably elastically contractible so as to be readily conformable, it is particularly desirable for surgical uses as it readily conforms to continuously tightly bind or cover areas effected by muscular reactions.

A further object of my invention, particularly useful when my improved adhesive fabric is employed as a surgical tape or bandage, is that it may be applied with adjustable tension, depending on the amount that the fabric is prestretched immediately prior to application, a considerable variation in tension being possible as a stretching of at least 10% up to the elastic limit of the bias cut fabric is always left in the finished fabric.

Further advantages of my invention, particularly when applied for surgical uses, are inherent in a bias cut fabric, namely, that a fabric is provided whose edges do not have a tendency to unravel that non-bias cut fabric has, and which edges are inherently softer due to the diagonal running of the threads and the termination of all the threads at the edges instead of leaving a longitudinal warp or filling thread adjacent an edge whch would tend to rub a wound or the adjacent skin, which such threads have tended to cause skin lacerations in non-bias cut fabrics. Due to its permeability or perviousness to air, my improved fabric permits the skin to breath or function more normally when applied for surgical uses, thus to lessen secondary skin lacerations and dermatitis. The fact that my improved adhesive fabric has no cutting edge minimizes laceration and trauma, particularly over areas of fatty or areolar tissues. Physicians have found that employing my improved adhesive tape as a surgical bandage, the tendency of adhesive dermatitis has been largely lessened and hence the chances of causing trauma, erythema, edema and occasionally denudation of the epidermis, formerly occasioned by standard types of surgical tape, are greatly lessened.

My improved fabric is also particularly advantageous for use as masking or other types of commercial tapes for it provides a new characteristic in such tapes, namely, conformability, enabling it to readily bend to closely bind around any irregular shaped object and tend to contract to hold itself or any other object close to said object. I am also able to provide an improved type of masking tape which may be placed in curved arcuate formation without wrinking, as it may be so bent in its application as to stretch on one side thereof more than the other, which feature is also highly desirable in surgical uses, such as in tightly bandaging any irregular object, such as a human breast or leg without fear of skin lacerations.

A further feature of one embodiment of my invention is that I am able to provide a novel type of gauze surgical bandage itself and thereby eliminate the use of surgical tape in association with a bandage. For this purpose I impregnate a conformable bias cut gauze fabric with longitudinally spaced areas of adhesive, whether in the form of dots or of relatively large areas. If in the form of relatively small dots the entire bandage may be stuck to the object to be bandaged. If in the form of relatively distantly longitudinally spaced areas, I am able to provide a bandage roll which can be applied without surgical tape and which may be packed in roll form to provide a plurality of such standard bandages merely by cutting through the relatively large areas of adhesive to provide a bandage having an adhesive area at each end thereof, and also if desired supplemental adhesive areas throughout the length thereof.

As stated hitherto, my improved method of prestretching a bias-cut fabric may be employed in close association with the method shown and claimed in my co-pending application for patent for Adhesive fabric and method of making same, Ser. No. 406,519, filed August 12, 1941, to provide a fabric having adhesive areas at least partially permeated through the fabric and with the other advantages of conformity and elasticity hitherto set forth.

These and such other objects of my invention as may hereinafter appear will be best understood from a description of the accompanying drawings which illustrate improved types of adhesive fabric constructed in accordance with my invention and illustrate diagrammatic steps in the manufacture thereof.

Figs. 1–7 illustrate an air pervious and conformable surgical tape comprising bias cut woven fabric prestretched in accordance with my invention, coated and permeated with spaced stripes of adhesive by my improved method, Fig. 1 being a perspective view illustrating a roll of such surgical tape and showing a portion of the inner surface thereof; Fig. 2 being a perspective view of a roll of such surgical tape and showing a portion of the outer surface thereof; Fig. 3 being a diagrammatic sectional view of an embodiment of surgical tape showing the adhesive stripes partially permeating the fabric; Fig. 4 being a sectional view similar to Fig. 3 but showing the actual threads so partially permeated with stripes of adhesive; Fig. 5 being a diagrammatic sectional view of an embodiment of completed tape showing the adhesive stripes on the surface thereof and stripes integral therewith completely permeating the fabric; Fig. 6 being a sectional view similar to Fig. 5 but showing the actual threads so permeated with the adhesive stripes; and Fig. 7 being a perspective view illustrating my improved type of surgical tape as shown in Figs. 1–6 in use, showing how it is conformable and elastically contractible to bind around an irregularly shaped anatomical object, such as a woman's breast.

Figs. 8–16 diagrammatically illustrate steps in my improved method of manufacturing my improved embodiment of adhesive surgical tape shown in Figs. 1–7, Fig. 8 being a diagrammatic plan view illustrating how a continuous sheet of fabric may be cut on the bias from a continuous woven tube; Fig. 9 being a diagrammatic side elevation illustrating the step of prestretching my improved bias cut fabric prior to the application of adhesive thereto; Fig. 10 being a diagrammatic side elevation illustrating the steps in my improved method of making said adhesive fabric, comprising applying the adhesive thereto in stripe formation prior to the drying operation in accordance with the method shown and described in said application aforesaid, while applying a second stretch immediately prior to the application of adhesive thereto and a third stretch immediately subsequent to the application of adhesive thereto; Fig. 11 being a diagrammatic plan view illustrating the step of cutting the wide strip of fabric after the drying operation into a plurality of widths suitable for surgical tape, Fig. 12 being a plan view diagrammatically illustrating the square spaces between the threads in the bias cut fabric prior to any stretching; Fig. 13 being a diagrammatic plan view of the fabric after it has been stretched 25% in the manner indicated in Fig. 9 to form diamond spaces between the threads with their acute angles pointing in the longitudinal direction of the fabric; Fig. 14 being a plan view diagrammatically illustrating the fabric showing the second stretch imparted thereto just prior to the application of adhesive thereto; Fig. 15 being a diagrammatic plan view of the third stretch applied to the fabric immediately after the application of adhesive thereto and prior to drying; and Fig. 16 being a diagrammatic plan view of such bias cut surgical tape after the fabric has been cut after drying in the manner indicated in Fig. 11 into the desired surgical tape widths.

Figs. 17–23 illustrate an elastically contractible and conformable commercial tape comprising bias cut woven fabric prestretched in accordance with my invention, coated and permeated with a continuous sheet of adhesive by my improved method, Fig. 17 being a perspective view illustrating a roll of such commercial tape and showing a portion of the inner surface thereof; Fig. 18 being a perspective view of a roll of such commercial tape and showing a portion of the outer surface thereof; Fig. 19 being a diagrammatic sectional view of an embodiment of commercial tape showing the adhesive sheet partially permeating the fabric; Fig. 20 being a sectional view similar to Fig. 19 but showing the actual threads so partially permeated with the sheet of adhesive; Fig. 21 being a diagrammatic sectional view of an embodiment of completed tape showing the adhesive sheet on the surface thereof and the adhesive sheet integral therewith completely permeating the fabric; Fig. 22 being a sectional view similar to Fig. 21 but showing the actual threads so permeated with the adhesive sheet; and Fig. 23 being a perspective view illustrating my improved type of commercial tape, as shown in Figs. 17–22, in use, showing how it is conformable and elastically contractible to bind around an irregularly shaped object, such as the edge of a package and tightly retain the wrapper thereto.

Figs. 24–32 diagrammatically illustrate steps in my improved method of manufacturing my improved embodiment of commercial adhesive tape shown in Figs. 17-23, Fig. 24 being a diagrammatic plan view illustrating how a continuous sheet of fabric may be cut on the bias from a continuous woven tube; Fig. 25 being a diagrammatic side elevation illustrating the step of prestretching my improved bias cut fabric prior to the application of adhesive thereto; Fig. 26 being a diagrammatic side elevation illustrating the steps in my improved method of making said adhesive fabric comprising applying the adhesive thereto in sheet formation prior to the drying operation in accordance with the method shown and described in said application aforesaid, while applying a second stretch immediately prior to the application of adhesive thereto and a third stretch immediately subsequent to the application of adhesive thereto; Fig. 27 being a diagrammatic plan view illustrating the step of cutting the wide strip of fabric after the drying operation into a plurality of widths suitable for surgical tape; Fig. 28 being a plan view diagrammatically illustrating the square spaces between the threads in the bias cut fabric prior to any stretching; Fig. 29 being a diagrammatic plan view of the fabric after it has been stretched 25% in the manner indicated in Fig. 25, forming diamond spaces between the threads with their acute angles pointing in the longitudinal direction of the fabric; Fig. 30 being a plan view diagrammatically illustrating the fabric showing the second stretch imparted thereto just prior to the application of adhesive thereto; Fig. 31 being a diagrammatic plan view of the third stretch applied to the fabric immediately after the application of adhesive thereto and prior to drying; Fig. 32 being a diagrammatic plan view of such commercial adhesive tape after the fabric has been cut after drying in the manner indicated in Fig. 27.

Figs. 33-39 illustrate an air pervious conformable surgical gauze bandage comprising bias cut woven gauze coated and permeated at longitudinally and transversely spaced distances thereof with areas of adhesive to provide a gauze bandage which may be employed without the use of surgical tape, Fig. 33 being a perspective view illustrating a roll of such gauze bandage and showing a portion of the inner surface thereof; Fig. 34 being a perspective view of a roll of such gauze bandage and showing a portion of the outer surface thereof; Fig. 35 being a diagrammatic sectional view of an embodiment of gauze bandage showing the adhesive areas partially permeating the fabric; Fig. 36 being a sectional view similar to Fig. 35 but showing the actual threads so partially permeated with areas of adhesive; Fig. 37 being a diagrammatic sectional view of an embodiment of completed bandage showing the adhesive areas on the surface thereof and areas integral therewith completely permeating the fabric; Fig. 38 being a sectional view similar to Fig. 37 but showing the actual threads so permeated with the adhesive areas; and Fig. 39 being a perspective view illustrating my improved type of surgical gauze bandage as shown in Figs. 33-38 in use, showing how it is conformable and elastically contractible to bind around an irregularly shaped anatomical object, such as a leg.

Figs. 40-50 diagrammatically illustrate steps in my improved method of manufacturing my improved embodiment of adhesive gauze bandage shown in Figs. 33-39, Fig. 40 being a diagrammatic plan view illustrating how a continuous sheet of fabric may be cut on the bias from a continuous woven tube; Fig. 41 being a diagrammatic side elevation illustrating the step of prestretching my improved bias cut fabric prior to the application of adhesive thereto; Fig. 42 being a diagrammatic side elevation illustrating the steps in my improved method of making said adhesive fabric comprising applying the adhesive thereto in spot formation prior to the drying operation in accordance with the method shown and described in said application aforesaid, while applying a second stretch immediately prior to the application of adhesive thereto and a third stretch immediately subsequent to the application of adhesive thereto; Fig. 43 being a diagrammatic plan view illustrating the step of cutting the wide strip of fabric after the drying operation into a plurality of widths suitable for surgical tape; Fig. 44 being a plan view diagrammatically illustrating the square spaces between the threads in the bias cut fabric prior to any stretching; Fig. 45 being a diagrammatic plan view of the fabric after it has been stretched 25% in the manner indicated in Fig. 41 to form diamond spaces between the threads with their acute angles pointing in the longitudinal direction of the fabric; Fig. 46 being a plan view diagrammatically illustrating the fabric showing the second stretch imparted thereto just prior to the application of adhesive thereto; Fig. 47 being a diagrammatic plan view of the third stretch applied to the fabric immediately after the application of adhesive thereto and prior to drying; Fig. 48 being a diagrammatic plan view of such bias cut surgical gauze bandage after the fabric has been cut after drying in the manner indicated in Fig. 43; and Figs. 49 and 50 being enlarged diagrammatic views illustrating how the feed valve for feeding the adhesive to the fabric may be moved from the open position shown in Fig. 49 to the closed position shown in Fig. 50 to apply the adhesive to the fabric in longitudinally spaced dots.

Figs. 51-57 illustrate an air pervious gauze bandage comprising bias cut woven gauze bandage coated and permeated at substantial longitudinally spaced intervals with spaced areas of adhesive by my improved method, Fig. 51 being a perspective view illustrating a roll of such gauze bandage and showing a portion of the inner surface thereof unrolled a substantial distance to illustrate a plurality of the widely longitudinally spaced areas of adhesive applied thereto and illustrating a pair of scissors in the act of cutting through one of said areas to provide a gauze bandage which may be wrapped around an object, as shown in Fig. 57, and adhesive bonded thereto at the ends thereof and, if desired, if intermediate areas of adhesive are provided intermediate the ends thereof, supplementally bonded thereto by said intermediate areas; Fig. 52 being a perspective view of a roll of such gauze bandage showing a portion of the outer surface thereof; Fig. 53 being a diagrammatic sectional view of an embodiment of gauze bandage showing the adhesive areas partially permeating the fabric; Fig. 54 being a sectional view similar to Fig. 53 but showing the actual threads so partially permeated with areas of adhesive; Fig. 55 being a diagrammatic sectional view of an embodiment of completed bandage showing the adhesive areas on the surface thereof and areas integral therewith completely permeating the fabric; Fig. 56 being a sectional view similar to Fig. 55 but showing the actual threads so permeated with the adhesive areas; and Fig. 57 being a perspective view illustrating my improved type of gauze bandage as shown in Figs. 51-56 in use, showing how it is conformable and elastically contractible to bind around an irregular anatomical object, such as an arm.

In the drawings, wherein like characters of reference generally indicate like parts throughout, 40 generally indicates an adhesive fabric constructed in accordance with my invention.

As stated hitherto, my invention may incorporate the features shown and described in my co-pending application for Letters Patent for Adhesive fabric and method of making the same, Ser. No. 406,519, filed August 12, 1941, in which a layer of adhesive at least partially permeates said fabric to form a layer of adhesive underneath at least some of said threads, and a layer of adhesive on the surface of said fabric integral with said permeated layer. My invention in the preferred embodiments shown is used upon a conformable bias cut fabric, and the specific embodiments shown herein are cut on the bias, prestretched and supplementally stretched while the fabric is being so treated in accordance with the teachings of said aforesaid application so as to be not only capable of stretching a supplemental amount up to their elastic limit in use, but to be also capable of returning substantially to their prestretched condition to be conformable to bend around any irregular shaped object in portions thereof or in their entirety, thus, when applied, to tend to tightly contract to closely bind to an object or bind another object against said object.

Said fabric includes a sheet of fabric 42 having warp threads 44 and weft or filling threads 46 and a continuous preferably single layer of adhesive 48 at least partially permeating said fabric forming a layer of adhesive 50 underneath at least some of the threads and a layer of adhesive 52 on the surface of said fabric integral with said permeated layer 50. If desired, said permeated layer 50 may partially permeate said fabric forming a layer of adhesive underneath at least some of the threads, as shown in Figs. 3 and 4, or it may completely permeate the fabric as shown in Figs. 5 and 6. To put the matter another way, I provide an adhesive fabric 40 comprising a sheet of fabric 42 having warp threads 44 and weft threads 46 and a continuous single layer 48 of adhesive having portions 52 covering said fabric and portions 50 of said same single layer 48 of adhesive at least partially permeating said fabric 42 to positively underlie and lock said entire layer 48, including the coated portion 52 to said fabric. It is immaterial whether said single layer 48 of adhesive be applied as a continuous layer extending longitudinally of the fabric, or as an intermittent layer comprising longitudinally spaced areas of adhesive on the face of the fabric. If desired, said layer may comprise the spaced stripes of adhesive 48 comprising said single layer covering said fabric, portions 50 of said spaced stripes of adhesive at least partially permeating said fabric to underlie at least some of said threads to positively lock said spaced stripes 48 of adhesive, including the covering portions 52 thereof to the fabric 42. If desired, however, as in the embodiment shown in Figs. 17-23, said layer 48' may comprise a continuous sheet 48' completely covering said fabric having a portion 52' covering said fabric and a portion of the same sheet 50' at least partially permeating said fabric 42 to underlie at least some of the threads 44 and 46 thereof to positively lock said integral sheet 48' of adhesive including the portion 52' thereof exposed on the surface thereof thereto.

Great difficulty has been experienced in the prior art in providing an adhesive fabric in which the covered layer of adhesive will not tear off as it is not permeatably locked to the fabric. It is obvious that with my invention employing at least portions 50 of said layer of adhesive 48 at least partially permeating said fabric 42 to underlie at least some of said threads 44 and 46, they will so positively lock said adhesive layer 48 to the sheet of fabric 42 that it will not pull off therefrom in use.

So far as I am aware, such a type of adhesive fabric 40 or 40' having the adhesive layer 48 or 48' positively interlocked therewith in the manner hitherto described can only be made in accordance with my improved method. Broadly speaking, my improved method comprises the method of making adhesive fabric 40 or 40', which comprises continuously passing a sheet of fabric 42 over a resilient pad 54 and forcing preferably continuously a mass of liquid adhesive 56 against said sheet of fabric 42 under a substantial gravity and fluid pressure to force at least a portion 50 or 50' of the layer 48 or 48' of said liquid adhesive within said fabric sheet 42 underneath at least some of the threads 44 and 46 thereof and to form a layer of adhesive 52 or 52' on the surface of said fabric sheet integral with said permeated layer 50 or 50', it being immaterial whether said layer 48 or 48' is permeated within and covers said fabric as a single layer in the form of a continuous sheet 48' or in the form of continuously transversely spaced longitudinal stripes to provide the stripes 48, or whether said continuous sheet or continuous stripes are broken to form intermittent longitudinally and/or transversely spaced areas of said permeated adhesive.

As stated, my improved method is substantially identical to the method shown and described in my aforesaid application, with the exception that the fabric is given a certain amount of stretching while the adhesive is still in a liquid condition prior to being dried. For this purpose the fabric may be given an initial prestretch prior to its being treated in the manner described in said aforesaid application and as diagrammatically illustrated in the transition from Fig. 12 to Fig. 13, the advantages of this prestretching having previously been carefully set forth. The fabric may then be given a second stretch immediately prior to the application of adhesive thereto, as diagrammatically illustrated in Fig. 14. The fabric may additionally be given a third stretch immediately after the application of adhesive thereto, as diagrammatically illustrated in Fig. 15. As stated hitherto, while each of these three stretches performs the desirable functions set forth hitherto, any of these stages of stretching may be omitted if desired. As stated hitherto, this application of the method shown in said aforesaid application is particularly adapted for use with bias cut fabrics. The bias cut fabric may be provided in any suitable manner. If desired, the sheet 58 may be cut on the bias from a continuous tube 94 of normally woven tubular fabric passing over a torpedo head 96 by a knife 98 rotating at 45° relative to the axis of said torpedo head as shown in Fig. 8. If desired, however, the bias cut sheet 58 may be formed in any suitable manner, such as by splicing together the edges of diagonal runs cut diagonally across a piece of fabric, or in other ways known in the art. As stated hitherto, I then preferably subject the continuous sheet 58 of bias cut fabric to a prestretching operation, usually prestretching it 25% of its width, changing the square shaped spaces 100 between the warp and filling threads shown in Figs. 12, 28 and 44 into the diamond shaped spaces 102 with the acute angle ends thereof pointing in the longitudinal direction of the fabric, as suggested in Figs. 13, 29 and 45. While the fabric may be thus prestretched in any suitable manner, I have diagrammatically illustrated in Figs. 9, 25 and 41 suitable apparatus for this purpose. A roll 104 of the bias cut fabric is suitably mounted adjacent one end of a series of horizontally aligned vertically extending ribs 106, 108 and 110 and a take-up roll 112 is mounted at the opposite end thereof. The take-up roll of continuous bias cut fabric 58 is rotated in any suitable manner, as by the motor 114, causing the bias cut fabric to pass from the supply roll 104 respectively over and under said ribs under the tension imparted thereby by the take-up roll 112, in the embodiment shown passing under the rib 106, over the rib 108 and under the rib 110. The supply roll 104 is suitably braked by the brake 116 which may be adjusted to provide the desired tension to the fabric being prestretched. The fabric is then treated in similar fashion as described in my co-pending application and as shown in Figs. 10, 26 and 42, and for this purpose I thus pass a continuous sheet 58 of fabric 42 from a suitable source of supply, such as the roll 60 over a pad cylinder 54 having a resilient outer surface suitably driven in any suitable manner, as by the motor 62. I then superimpose a relatively stationary fountain 64 on said sheet of fabric 58 passing over said rotating pad cylinder 54 under substantial gravity pressure, which may be conveniently provided by pivoting the fountain 64 on a pivot rod extending transversely of the cylinder above the fabric so that the weight of the fountain will bear against the continuous sheet of fabric 58 passing over the surface of the resilient pad cylinder 54. If desired, the sheet of fabric 58 may be suitably braked in any suitable manner, such as by the counter-weight 66 mounted on a strap 67 passing over the roll 60 to retain it in a taut condition until it passes between the nip 68 formed between the fountain 64 and said resilient pad cylinder 54. After the continuous sheet of fabric 58 has passed through the nip 68, it may then be taken up in any suitable manner, such as on the reel 70, suitably rotated in any suitable manner, such as by the motor 62 to draw said continuous sheet of fabric in a taut condition from the nip 68 to said reel 70. A suitably adjustable counter-weight 72 may be added to the fountain 64 to increase the gravity pressure of the fountain against the sheet 58 passing thereunder and the pad cylinder 54 so that the fountain 64 may function as a hollow stamp so firmly impressed against the fabric and the resilient surface of the pad cylinder that no leakage around the edges of the hollow stamp is possible. I then force a mass of liquid adhesive 56 through said stationary fountain 64 under substantial fluid pressure as a single layer into said sheet of fabric 58 passing thereunder, and I preferably simultaneously leave a portion 52 of said single layer on the surface of said fabric by providing passageway means 74 on the lower surface of said fountain 14 behind the points at which the adhesive is forced into said fabric 58 to provide passageway means 74 between the rear portion of the fountain 64 and the pad cylinder 54 underneath it to force a layer 50 of liquid adhesive within said fabric sheet and underneath at least some of the threads thereof, and simultaneously a layer 52 of adhesive on the surface of said fabric sheet integral with said permeated layer 50. In order that the portion 50 of said layer may be impregnated within said fabric and the surface portion 52 thereof compactly laid on said fabric sheet 58, said passageway means 74 is preferably provided of progressively decreasing height, as at 76, for this purpose. Any suitable means may be provided to force the liquid adhesive 56 under adjustably variable substantial fluid pressure from the fountain 64, such as the source of fluid pressure 78 comprising the compresser 78 actuated by the pump 80 forcing compressed air within the liquid adhesive container 82 to force it through the pipe 84 to within a suitable reservoir (not shown) within the fountain 64. While I have shown a suitable apparatus capable of carrying out my method, it is obvious that my improved method may be accomplished manually or in any other suitable type of apparatus. It is obvious that the gravity pressure aids in compacting the layer 48 of adhesive and forcing the portion 50 thereof within the fabric, but that this permeation of the layer 48 within said fabric as at 50 is largely accomplished by the application of the fluid pressure and by the compacting of the layer 52 on the surface of the fabric 58 caused by the decreasing size of the passageway means 74. It is obvious, however, that substantial permeation or penetration of the fabric will take place if the size of the passageway means 74 is not varied throughout its length. It is obvious that the fluid pressure must be so regulated as to be not greater than the gravity pressure causing the fountain 64 to bear against the pad cylinder 54 so as to cause a bleeding or leakage of liquid adhesive around the edges of said fountain or a complete blow out of liquid adhesive at this point. If it be desired to provide spaced stripes 48 of adhesive on the fabric the passageway means may comprise a plurality of spaced channels or grooves 74 as shown in Fig. 10. If it be desired to provide a continuous sheet 48' of adhesive on the fabric the passageway means may comprise a continuous transverse slot 74' as shown in Fig. 26.

As stated hitherto, the fabric is applied a second stretch immediately prior to passage through the nip 68, the desired amount of stretch being achieved by varying the number of counter-weights added or removed to the adjustable weight 66. As stated hitherto, the fabric may be given a third stretch between the nip 68 and the take-up reel 70. The amount of this stretch may be varied by varying the amount of the take-up of the take-up reel 76, which may be accomplished by varying the braking effect on the reel, or the effective speed of the motor. In giving the second prestretch, the diamond shaped spaces 102 are further elongated into the diamond shaped spaces 118 provided with the more acute angles, as shown in Figs. 14, 30 and 46 and during the third stage of prestretching the diamond shaped spaces are further stretched into the still narrower spaces 120 having the more acute angles as shown in Figs. 15, 31 and 47, the fabric 58 being simultaneously elongated and narrowed in the manner shown in said figures. The fabric is then passed to a suitable drying or conditioning chamber or room where it is suitably dried, and during this period the solvent may be driven off the rubber adhesive, providing interstices or voids therein tending to make it more contractible and removing the drugging effect of the solvent on the rubber adhesive to render it again elastic. The continuous sheet 58 may be cut in any suitable manner, such as by the knives 122 functioning against the surface 124 immediately below them into the desired selective widths for surgical or commercial tape as shown in Figs. 4, 27 and 43. Any suitable type of adhesive may be employed, which adhesive may be applied hot or in solution, preferably in solution to provide when affixed a pressure sensitive adhesive.

For the reasons given above, I preferably employ a suitable pressure sensitive rubber adhesive and apply it in a suitable solvent so that when the solvent is driven off in the drying operation, the voids hitherto described may be formed in the continuous sheet of adhesive and the rubber will once more come to life to resume its former elasticity and resiliency, the rubber being drugged by the solvent and/or heat during the stretching operation.

I have shown in Figs. 1–7 an air pervious conformable surgical tape 92 comprising a bias cut woven fabric 40 coated with the spaced stripes 50 and permeated with the spaced stripes 52 integral therewith to make up the integral composite adhesive stripes 48, cut into suitable widths for surgical tape. In the embodiment shown in Figs. 3 and 4, the spaced stripe portions 50 thereof are only permeated partially through said fabric and in the embodiment shown in Figs. 5 and 6, said striped portions 50 are substantially totally permeated through the fabric 42. I have illustrated in Fig. 7 the preferred embodiment of surgical tape shown in Figs. 1–6, applied in use to tightly bind a wound or bandage around and against an irregularly shaped object, such as a woman's breast 125, with the tape conforming laterally in its degree of stretchability, as well as longitudinally to the contour of the object being bound, and contracting to firmly and tightly support and bind said object.

This type of surgical tape is air pervious, due to the spaced breathing stripes 126 formed intermediate said spaced adhesive stripes 48. As stated, Figs. 8–16 illustrate my improved method of manufacturing the air pervious and conformable surgical tape shown in Figs. 1–7.

I have shown in Figs. 17–23 my invention applied to a so-called commercial or masking tape 40'. As shown in Figs. 24–32, said embodiment of adhesive fabric is made substantially identically as the surgical tape shown in Figs. 1–7, only the passageway means is so shaped in the form of a slot 74' as to apply the adhesive in sheet formation 48' with a single run providing the sheet 50' partially permeating the fabric and the sheet 52' integral therewith covering the fabric. This type of fabric may be employed in any place where so-called commercial or masking tape is employed either in true masking in painting or spraying or as a binder, reinforcement or otherwise. In the embodiment of my invention shown in Figs. 19 and 20, the sheet 50' is permeated partially through the fabric, whereas in the embodiment of my invention shown in Figs. 21 and 22, the sheet 50' is permeated substantially through the fabric. I have shown in Fig. 23 the improved embodiment of tape shown in Figs. 19–22 employed as a conformable binder. Due to the fact that stretchable bias cut fabric is preferably employed, it is obvious that the tape may be bent intermediate the edges thereof to conform around any angular surface, such as shown at 128, binding the edges of a wrapper 130 around the edge of a package 132.

I have shown in Figs. 33–39 my invention applied to a conformable but not as elastically contractible commercial gauze bandage 40", in which the adhesive is applied in dotted spaced areas 48", the dots being spaced longitudinally and laterally from each other. With this construction I am able to provide a bandage which may be directly applied as a bandage without the use of surgical tape. As shown in Fig. 39, said bandage may be directly applied to a foot 137 and have any desired medicament thereon and conform to the shape of the foot or any other anatomical object without the necessity of employing surgical tape. However, where the adhesive is applied in longitudinally spaced areas, it is obvious that such fabrics will not be as elastically contractible as in the embodiments previously described provided with the continuous longitudinal elastic sheets 48' or stripes 48.

As shown in Figs. 40–48, such gauze fabric 40" is made by being treated identically as the fabric shown in Figs. 17–23, only the liquid adhesive 56 is applied to the gauze fabric 42" in longitudinally and transversely spaced dots or areas 48", with the single layer providing the dots or areas 50" partially permeating the fabric and the dots or areas 52" integral therewith covering the fabric. This intermittent feed of adhesive may be provided by employing the valve 128 in the feeding means from the fountain reservoir (not shown), having the orifice means 130 therein and the turning handle 132 thereof normally urged by the spring 134 to a position closing the valve 128, as shown in Fig. 50. The pad cylinder 54 is provided at peripherally spaced intervals thereof with the cam pins 136 adapted to partially rotate the handle 132 to temporarily bring the orifice means 130 in the valve 128 in line with the reservoir to intermittently apply the longitudinally spaced areas 48" of adhesive to the fabric. After the handle 132 has passed by the respective stop pins 136, the spring 138 again functions to partially rotate the handle 132 to again bring the orifice means 130 in the valve 128 out of alignment with the passage from the said reservoir to the feeding means of the fountain. This type of fabric may be employed in any place where a gauze bandage with or without medicament has hitherto been employed, it being obvious that it will readily conform to the shape of any object to be bandaged, such as a leg 137 having the varicose veins 138 shown in Fig. 39. In the embodiment of my invention shown in Figs. 35 and 36, the dots or areas 50" are permeated partially through the fabric, whereas in the embodiment of my invention shown in Figs. 37 and 38, the dots or areas are permeated substantially through the fabric.

I have shown in Figs. 51–57, my invention applied to a gauze bandage 40''' identical in many respects to the gauze bandage shown in Figs. 33–39, but in which the spaced areas 48''' of adhesive extend all the way across the bandage and are applied to the fabric at widely spaced longitudinal intervals as shown. This type of fabric may be made in accordance with the modification of my improved method diagrammatically illustrated in Figs. 40–48, modifying the valve structure 128 to have the orifice means 130 thereof extend transversely of the tape and to function substantially only on a single revolution of the pad cylinder 54. It is thus obvious that with this construction, a gauze bandage of the desired length between certain of said intermittent areas 48''' of adhesive may be provided by cutting through certain of said areas of adhesive 48''' in any suitable manner, such as by the shears 140, to provide the individual bandage 142 shown beyond the shears, having an area of adhesive 144 at each end thereof comprising a cut portion of an area 48''' of adhesive, and if desired, an intermediate area of adhesive 146 intermediate said areas 144 at the ends of said bandage 142. It is thus obvious that I have provided a ready conformable and air pervious bandage which may be employed without any surgical tape in the manner shown in Fig. 57, around any irregularly shaped anatomical object to conform thereto, as around the arm 148 shown in Fig. 57, and that said bandage may be bound to said arm at each end thereof by the respective areas 144, and if desired, intermediate the ends thereof by the intermediate areas 146. In the embodiment of my invention shown in Figs. 53 and 54, the areas 50''' of adhesive are permeated partially through the fabric, whereas in the embodiment of my invention shown in Figs. 55 and 56, the areas 50''' of adhesive are permeated substantially through the fabric.

While I have shown the various respective areas of adhesive as preferably at least partially permeated through the fabric in all embodiments, it is apparent that I may provide novel types of adhesive fabrics if the surface coverings 52 thereof are merely bonded to the base fabrics 42 thereof.

It is apparent, therefore, that I have provided a novel type of adhesive fabric which in all embodiments is readily conformable and in certain embodiments is air pervious and in other embodiments is stretchable and elastically contractable, in all embodiments being constructed with one or more of these features, and a novel method of making such type of adhesive fabric with the advantages described above.

It is understood that my invention is not limited to the specific embodiments shown or methods described and that various deviations may be made therefrom without departing from the spirit and scope of the appended claims.

What I claim is:

1. The method of making elastically contractible adhesive fabric, which comprises, prestretching a continuous fabric sheet having its warp and weft threads diagonally disposed in relation to its edges a predetermined amount substantially less than its elastic limit, continuously applying a layer of plastic adhesive to one face of said fabric sheet while again stretching said prestretched fabric sheet an additional predetermined amount substantially less than its elastic limit and drying said fabric in said stretched condition to provide on setting of said adhesive, a fabric sheet capable of stretching in use an additional amount up to its elastic limit having a continuous elastic layer of adhesive bonded thereto tending to return said then stretched sheet substantially to its just previous unstretched condition.

2. The method of making elastically contractible adhesive fabric which comprises, prestretching a continuous fabric sheet having its warp and weft threads diagonally disposed in relation to its edges a predetermined amount substantially less than its elastic limit, continuously applying spaced stripes of plastic adhesive to one face of said fabric sheet while again stretching said prestretched fabric sheet an additional predetermined amount substantially less than its elastic limit and drying said fabric in said stretched condition to provide on setting of said adhesive, a fabric sheet capable of stretching in use an additional amount up to its elastic limit having continuous elastic spaced stripes of adhesive bonded thereto tending to return said then stretched sheet substantially to its just previous unstretched condition.

3. The method of making elastically contractible adhesive fabric which comprises, prestretching a continuous fabric sheet having its warp and weft threads diagonally disposed in relation to its edges a predetermined amount substantially less than its elastic limit, continuously applying a sheet of plastic adhesive to one face of said fabric sheet while again stretching said prestretched fabric sheet an additional predetermined amount substantially less than its elastic limit and drying said fabric in said stretched condition to provide on setting of said adhesive, a fabric sheet capable of stretching in use an additional amount up to its elastic limit having a continuous elastic sheet of adhesive bonded thereto tending to return said then stretched sheet substantially to its just previous unstretched condition.

4. The method of making elastically contractible adhesive fabric which comprises, prestretching a continuous fabric sheet having its warp and weft threads diagonally disposed in relation to its edges a predetermined amount substantially less than its elastic limit, applying a layer of plastic adhesive to one face of said fabric sheet while again stretching said prestretched fabric sheet an additional predetermined amount substantially less than its elastic limit and drying said fabric in said stretched condition to provide on setting of said adhesive, a fabric sheet capable of stretching in use an additional amount up to its elastic limit.

5. In the method of making elastically contractible adhesive fabric including the step of coating said fabric between a moving resilient surface and a relatively stationary fountain having adhesive feeding means, the steps which comprise prestretching a continuous fabric sheet having its warp and weft threads diagonally disposed in relation to its edges a predetermined amount substantially less than its elastic limit, continuously passing said prestretched sheet over said resilient surface, forcing said fountain against said resilient surface to provide a traction nip for feeding said fabric between said surface and fountain and to provide a dam exterior of said adhesive feeding means, continuously forcing liquid adhesive through said adhesive feeding means under sufficient pressure to form a continuous layer of said liquid adhesive within said fabric sheet underneath at least some of the threads thereof and to form a continuous integral layer of adhesive on the surface of said fabric sheet, while for a second time stretching said fabric sheet to a predetermined width in front of said traction nip and for a third time stretching said coated fabric sheet an additional predetermined amount substantially less than its elastic limit in rear of said traction nip to provide on setting of said adhesive, a fabric sheet capable of stretching in use an additional amount up to its elastic limit having a continuous elastic layer of adhesive so covering and permeating said fabric sheet as to return said then stretched fabric sheet substantially to its just previous unstretched condition.

6. In the method of making elastically contractible adhesive fabric including the step of coating said fabric between a moving resilient surface and a relatively stationary fountain having adhesive feeding means, the steps which comprise prestretching a continuous fabric sheet having its warp and weft threads diagonally disposed in relation to its edges a predetermined amount substantially less than its elastic limit, continuously passing said prestretched sheet over said resilient surface, forcing said fountain against said resilient surface to provide a traction nip for feeding said fabric between said surface and fountain and to provide a dam exterior of said adhesive feeding means, continuously forcing liquid adhesive through said adhesive feeding means under sufficient pressure to force a continuous sheet of said liquid adhesive within said fabric sheet underneath at least some of the threads thereof and to form a continuous integral sheet of adhesive on the surface of said fabric sheet while for a second time stretching said fabric sheet to a predetermined width in front of said traction nip and for a third time stretching said coated fabric sheet an additional predetermined amount substantially less than its elastic limit in rear of said traction nip to provide on setting of said adhesive, a fabric sheet capable of stretching in use an additional amount up to its elastic limit having a continuous elastic sheet of adhesive so covering and permeating said fabric sheet as to return said then stretched fabric sheet substantially to its just previous unstretched condition.

7. In the method of making elastically contractible adhesive fabric including the step of coating said fabric between a moving resilient surface and a relatively stationary fountain having adhesive feeding means having slots, the steps which comprise prestretching a continuous fabric sheet having its warp and weft threads disposed in relation to its edges a predetermined amount substantially less than its elastic limit, continuously passing said prestretched sheet over said resilient surface, forcing said fountain against said resilient surface to provide a traction nip for feeding said fabric between said surface and fountain and to provide a dam exterior of said adhesive feeding means, continuously forcing liquid adhesive through said adhesive feeding means comprising slots under sufficient pressure to force continuous stripes of said liquid adhesive within said fabric sheet underneath at least some of the threads thereof and to form continuous integral stripes of adhesive on the surface of said fabric sheet while for a second time stretching said fabric sheet to a predetermined width in front of said traction nip and for a third time stretching said coated fabric sheet an additional predetermined amount substantially less than its elastic limit in rear of said traction nip to provide on setting of said adhesive, a fabric sheet capable of stretching in use an additional amount up to its elastic limit having continuous elastic stripes of adhesive so covering and permeating said fabric sheet as to return said then stretched fabric sheet substantially to its just previous unstretched condition.

8. In the method of making elastically contractible adhesive fabric including the step of coating said fabric between a moving resilient surface and a relatively stationary fountain having adhesive feeding means, the steps which comprise prestretching a continuous fabric sheet having its warp and weft threads diagonally disposed in relation to its edges a predetermined amount substantially less than its elastic limit, continuously passing said prestretched sheet over said resilient surface, forcing said fountain against said resilient surface to provide a traction nip for feeding said fabric between said surface and fountain and to provide a dam exterior of said adhesive feeding means, intermittently forcing liquid adhesive through said adhesive feeding means under sufficient pressure to force longitudinally spaced areas of said liquid adhesive within said fabric sheet underneath at least some of the threads thereof and to form integral longitudinally spaced areas of adhesive on the surface of said fabric sheet while for a second time stretching said fabric sheet to a predetermined width in front of said traction nip and for a third time stretching said coated fabric sheet an additional predetermined amount substantially less than its elastic limit in rear of said traction nip to provide on setting of said adhesive, a fabric sheet capable of stretching in use an additional amount up to its elastic limit having longitudinally spaced areas of adhesive so covering and permeating said fabric sheet as to aid in returning said then stretched fabric sheet substantially to its just previous unstretched condition.

9. In the method of making elastically contractible adhesive fabric including the step of coating said fabric between a moving resilient surface and a relatively stationary fountain having adhesive feeding means, the steps which comprise prestretching a continuous fabric sheet having its warp and weft threads diagonally disposed in relation to its edges a predetermined amount substantially less than its elastic limit, continuously passing said prestretched sheet over said resilient surface, forcing said fountain against said resilient surface to provide a traction nip for feeding said fabric between said surface and fountain and to provide a dam exterior of said adhesive feeding means, forcing liquid adhesive through said adhesive feeding means under sufficient pressure to force a layer of said liquid adhesive within said fabric sheet underneath at least some of the threads thereof and to form an integral layer of adhesive on the surface of said fabric sheet, while for a second time stretching said fabric sheet to a predetermined width in front of said traction nip and for a third time stretching said coated fabric sheet an additional predetermined amount substantially less than its elastic limit in rear of said traction nip to provide onsetting of said adhesive, a fabric sheet capable of stretching in use an additional amount up to its elastic limit having an elastic layer of adhesive so covering and permeating said fabric sheet as to aid in returning said then stretched fabric sheet substantially to its just previous unstretched condition.

10. Elastically contractible adhesive fabric comprising a sheet of fabric having warp and weft threads diagonally disposed in relation to its edges prestretched a predetermined amount substantially less than its elastic limit and having a continuous layer of elastic adhesive partially permeating said fabric sheet forming a continuous layer of adhesive underneath at least some of said threads and a continuous layer of adhesive on the surface of said fabric sheet integral with said permeated layer, whereby said adhesive fabric may be capable of stretching in use an additional amount up to its elastic limit and said continuous elastic adhesive layer may tend to return said then stretched sheet substantially to its just previous unstretched condition.

11. Elastically contractible adhesive fabric comprising a sheet of fabric having warp and weft threads diagonally disposed in relation to its edges prestretched a predetermined amount substantially less than its elastic limit and having a continuous layer of elastic adhesive bonded thereto, whereby said adhesive fabric may be capable of stretching in use an additional amount up to its elastic limit and said continuous elastic adhesive layer may tend to return said then stretched sheet substantially to its just previous unstretched condition.

12. Elastically contractible adhesive fabric comprising, a sheet of fabric having warp and weft threads diagonally disposed in relation to its edges prestretched a predetermined amount substantially less than its elastic limit and having a layer of elastic adhesive partially permeating said fabric sheet forming a layer of adhesive underneath at least some of said threads and a layer of adhesive on the surface of said fabric sheet integral with said permeated layer, whereby said adhesive fabric may be capable of stretching in use an additional amount up to its elastic limit and said elastic adhesive layer may tend to return said then stretched sheet substantially to its just previous unstretched condition.

13. Elastically contractible adhesive fabric comprising a sheet of fabric having warp and weft threads diagonally disposed in relation to its edges prestretched a predetermined amount substantially less than its elastic limit and having a layer of elastic adhesive bonded thereto, whereby said adhesive fabric may be capable of stretching in use an additional amount up to its elastic limit and said elastic adhesive layer may tend to return said then stretched sheet substantially to its just previous unstretched condition.

14. Elastically contractible adhesive fabric comprising a sheet of fabric having warp and weft threads diagonally disposed in relation to its edges prestretched a predetermined amount substantially less than its elastic limit and having a layer of elastic adhesive partially permeating said fabric sheet forming a layer of adhesive underneath at least some of said threads and a layer of adhesive on the surface of said fabric sheet integral with said permeated layer at longitudinally spaced intervals thereon, whereby said adhesive fabric may be capable of stretching in use an additional amount up to its elastic limit and said elastic adhesive layer may tend to return said then stretched sheet substantially to its just previous unstretched condition.

15. Elastically contractible adhesive fabric comprising a sheet of fabric having warp and weft threads diagonally disposed in relation to its edges prestretched a predetermined amount substantially less than its elastic limit and having a layer of elastic adhesive bonded thereto at longitudinally spaced intervals thereon, whereby said adhesive fabric may be capable of stretching in use an additional amount up to its elastic limit and said elastic adhesive layer may tend to return said then stretched sheet substantially to its just previous unstretched condition.

16. Elastically contractible air pervious and conformable adhesive fabric comprising a sheet of fabric having warp and weft threads diagonally disposed in relation to its edges prestretched a predetermined amount substantially less than its elastic limit and having continuous spaced stripes of elastic adhesive partially permeating said fabric sheet forming spaced stripes of adhesive underneath at least some of said threads and spaced stripes of adhesive on the surface of said fabric sheet integral with said permeated stripes, whereby said adhesive fabric may be capable of stretching in use an additional amount up to its elastic limit and said continuous elastic adhesive stripes may tend to return said then stretched sheet substantially to its just previous unstretched condition.

17. Elastically contractible air pervious and conformable adhesive fabric comprising a sheet of fabric having warp and weft threads diagonally disposed in relation to its edges prestretched a predetermined amount substantially less than its elastic limit and having continuous spaced stripes of elastic adhesive bonded thereto, whereby said adhesive fabric may be capable of stretching in use an additional amount up to its elastic limit and said elastic adhesive stripes may tend to return said then stretched sheet substantially to its just previous unstretched condition.

HAROLD A. EVANS.